(12) United States Patent
Perrow et al.

(10) Patent No.: US 9,098,590 B2
(45) Date of Patent: *Aug. 4, 2015

(54) CONTENT ITEM SELECTION

(75) Inventors: Michael Perrow, Sydney (AU); James Robert MacGill, Morristown, NJ (US); Dana Zhang, Ivanhoe East (AU); Nicholas Verne, Balmain (AU); David Symonds, Hornsby (AU)

(73) Assignee: Google Inc., Mountain View, CA (US)

( * ) Notice: Subject to any disclaimer, the term of this patent is extended or adjusted under 35 U.S.C. 154(b) by 351 days.

This patent is subject to a terminal disclaimer.

(21) Appl. No.: 13/493,591

(22) Filed: Jun. 11, 2012

(65) Prior Publication Data

US 2012/0246177 A1    Sep. 27, 2012

Related U.S. Application Data

(63) Continuation of application No. 12/172,335, filed on Jul. 14, 2008, now Pat. No. 8,201,089.

(51) Int. Cl.
*G06F 17/22* (2006.01)
*G06F 17/30* (2006.01)
*G06Q 30/02* (2012.01)

(52) U.S. Cl.
CPC ...... *G06F 17/3087* (2013.01); *G06F 17/30241* (2013.01); *G06Q 30/0261* (2013.01)

(58) Field of Classification Search
CPC .......... G06F 17/3087; G06F 17/30241; G06Q 30/0261
USPC ......... 715/200, 201, 202, 204, 205, 232, 246, 715/247, 256, 737, 738, 763
See application file for complete search history.

(56) References Cited

U.S. PATENT DOCUMENTS

| | | | |
|---|---|---|---|
| 5,684,940 A | 11/1997 | Freeman et al. | |
| 6,424,933 B1* | 7/2002 | Agrawala et al. | 703/2 |
| 6,565,610 B1* | 5/2003 | Wang et al. | 715/210 |
| 6,665,840 B1* | 12/2003 | Wiley et al. | 715/234 |
| 7,089,264 B1* | 8/2006 | Guido et al. | 1/1 |
| 7,131,060 B1* | 10/2006 | Azuma | 715/260 |
| 7,576,754 B1* | 8/2009 | Joseph et al. | 345/619 |
| 7,595,725 B1* | 9/2009 | Joseph et al. | 340/539.2 |
| 7,788,216 B2 | 8/2010 | Li et al. | |

(Continued)

FOREIGN PATENT DOCUMENTS

| | | |
|---|---|---|
| JP | 2002-117034 | 4/2002 |
| JP | 2002-279109 | 9/2002 |

(Continued)

OTHER PUBLICATIONS

Australian Examiner Debasish Dasgupta, Patent Examination Report No. 1, for AU 2013202220 dated Sep. 16, 2013, 3 pages.

(Continued)

*Primary Examiner* — Maikhanh Nguyen
(74) *Attorney, Agent, or Firm* — Fish & Richardson P.C.

(57) ABSTRACT

A content item, e.g., an icon or advertisement content, is selected for placement in a display environment (e.g., on a map or adjacent to a map) in response to a request for the display environment based on a probability that the content item is relevant to a user that is requesting the display environment. The selection is facilitated by content targeting data (e.g., feature selection and query submission) that can be received from user devices while the map space is presented.

9 Claims, 7 Drawing Sheets

(56) References Cited

U.S. PATENT DOCUMENTS

| | | | |
|---|---|---|---|
| 7,983,949 B1* | 7/2011 | Joseph et al. | 705/14.58 |
| 8,249,930 B2* | 8/2012 | Badger et al. | 705/14.4 |
| 8,312,380 B2* | 11/2012 | Churchill et al. | 715/753 |
| 8,682,725 B2* | 3/2014 | Jain et al. | 705/14.58 |
| 2002/0019831 A1 | 2/2002 | Wade | |
| 2002/0042819 A1* | 4/2002 | Reichert et al. | 709/217 |
| 2003/0074136 A1* | 4/2003 | Hancock et al. | 701/213 |
| 2004/0032417 A1 | 2/2004 | Chen et al. | |
| 2004/0093327 A1* | 5/2004 | Anderson et al. | 707/3 |
| 2005/0027705 A1* | 2/2005 | Sadri et al. | 707/5 |
| 2005/0102101 A1* | 5/2005 | Beesley et al. | 701/209 |
| 2005/0234895 A1 | 10/2005 | Kramer | |
| 2006/0200383 A1* | 9/2006 | Arutunian et al. | 705/14 |
| 2007/0061070 A1 | 3/2007 | Aoto | |
| 2007/0165050 A1* | 7/2007 | Baar | 345/660 |
| 2007/0233375 A1 | 10/2007 | Garg et al. | |
| 2008/0034088 A1 | 2/2008 | Suresh | |
| 2008/0036787 A1 | 2/2008 | Gelber | |
| 2008/0046923 A1 | 2/2008 | Enderwick | |
| 2008/0133336 A1 | 6/2008 | Altman et al. | |
| 2008/0133579 A1 | 6/2008 | Lim | |

FOREIGN PATENT DOCUMENTS

| | | |
|---|---|---|
| JP | 2003323568 A | 11/2003 |
| JP | 2005165749 A | 6/2005 |
| JP | 2006-277386 | 10/2006 |
| JP | 2007011161 A | 1/2007 |
| JP | 2007328469 A | 12/2007 |
| JP | 2008090802 A | 4/2008 |
| WO | WO2008056578 A1 | 5/2008 |

OTHER PUBLICATIONS

Japanese Examiner Daishin Nozaki, Notice of Reasons for Rejection for JP2011-518821 dated Aug. 20, 2013, 6 pages.

PCT International Search Report and the Written Opinion, PCT/US2009/050412, Feb. 25, 2010, 11 pages.

International Preliminary Report on Patentability, for PCT/US2009/050412, dated Jan. 18, 2011, 6 pages.

Notification of the Third Office Action in Chinese Application No. 200980135124.8, mailed Jul. 22, 2014, 16 pages (with English translation).

Notice of Reasons for Rejection for Japanese Application No. 2014-030280, mailed Oct. 6, 2014, 6 pages (with English translation).

Communication pursuant to Article 94(3) EPC for EP 09 798 612.9 dated Mar. 28, 2014, 10 pages (no new art).

Communication pursuant to Article 94(3) EPC for EP 09 798 612.9 dated Jan. 14, 2013, 3 pages.

Communication , Supplemental European Search Report for EP 097981612.9 dated Jan. 2, 2013, 2 pages.

* cited by examiner

US 9,098,590 B2

CONTENT ITEM SELECTION

CROSS-REFERENCE TO RELATED APPLICATIONS

This application is a continuation application of, and claims priority to, U.S. patent application Ser. No. 12/172,335, entitled "CONTENT ITEM SELECTION", to inventors Mike Perrow et al., which was filed on Jul. 14, 2008 and issued as U.S. Pat. No. 8,201,089 on Jun. 12, 2012. The disclosure of the foregoing application is incorporated herein by reference in its entirety.

BACKGROUND

This subject matter of this specification relates to information selection.

The Internet facilitates easy access to on-line mapping systems for millions of people. These on-line mapping systems can provide detailed maps of geographic regions at a variety of zoom levels. Additionally, the dynamic nature of these on-line mapping systems can facilitate the targeted presentation of content, such as advertisements. For example, a coffee retailer can provide advertisements in the form of selectable icons that are rendered on a map page that is displayed on a client device, such as a computer. Mousing over the icon can reveal additional advertising information, such as the coffee retailer's business name and contact information, including the address.

The content items can be selected for presentation with the map based, for example, on the portion of the map that is presented. However, when content items are presented based solely on the address of the advertising entity, it is possible that the advertisement selected is not relevant to the user. For example, the user may be viewing a map of a potential vacation destination, while the presented content item is for a plumber that has a business that is located in the displayed portion of the map. Displaying advertisements that are irrelevant to a user's interests can degrade the user experience.

SUMMARY

The subject matter of this specification relates to selection of content items, e.g., advertisements, for display in a display environment (e.g., on maps or adjacent to maps). The content items can be selected based on the probability that the content items are relevant to users that request the display environment. The probability that the content items are relevant can be determined, for example, based on input data that has been received from users while the display environment is presented. The input data can correspond to user interactions in a display environment (e.g., mouse click, feature selection, submitted queries, user queries received while the display environment is presented, etc.). Content targeting data (e.g., topic data) can be identified based on the input data and content items can be selected for presentation based on the content targeting data.

In general, one aspect of the subject matter described in this specification can be embodied in a method that includes the actions of receiving a request for a map space, wherein the map space is a portion of a map for presentation in a display region on a user device; identifying content targeting data associated with the map space, the content targeting data based on input data that have been received from display interfaces in response to presentations of the map space in the display regions prior to the request for the map space; identifying a content item for display with the map space based on the content targeting data; and providing the content item for display in the display region on the user device in response to the request for the map space. Other embodiments of this aspect include corresponding methods, apparatus, and computer program products.

Another aspect of the subject matter described in this specification can be embodied in a method that includes the actions of receiving input data from user devices, the input data having been input in display interfaces displayed on user devices; associating the input data with map spaces, each data input being associated with a map space that was displayed in a display region on a user device when the data input was input in the display region at the user device; for each map space, generating content targeting data based on the associated input data; and providing access to the content targeting data for each map space to facilitate identification of content items for display with the map spaces. Other embodiments of this aspect include corresponding methods, apparatus, and computer program products.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

§1.0 Overview

Figure 1:
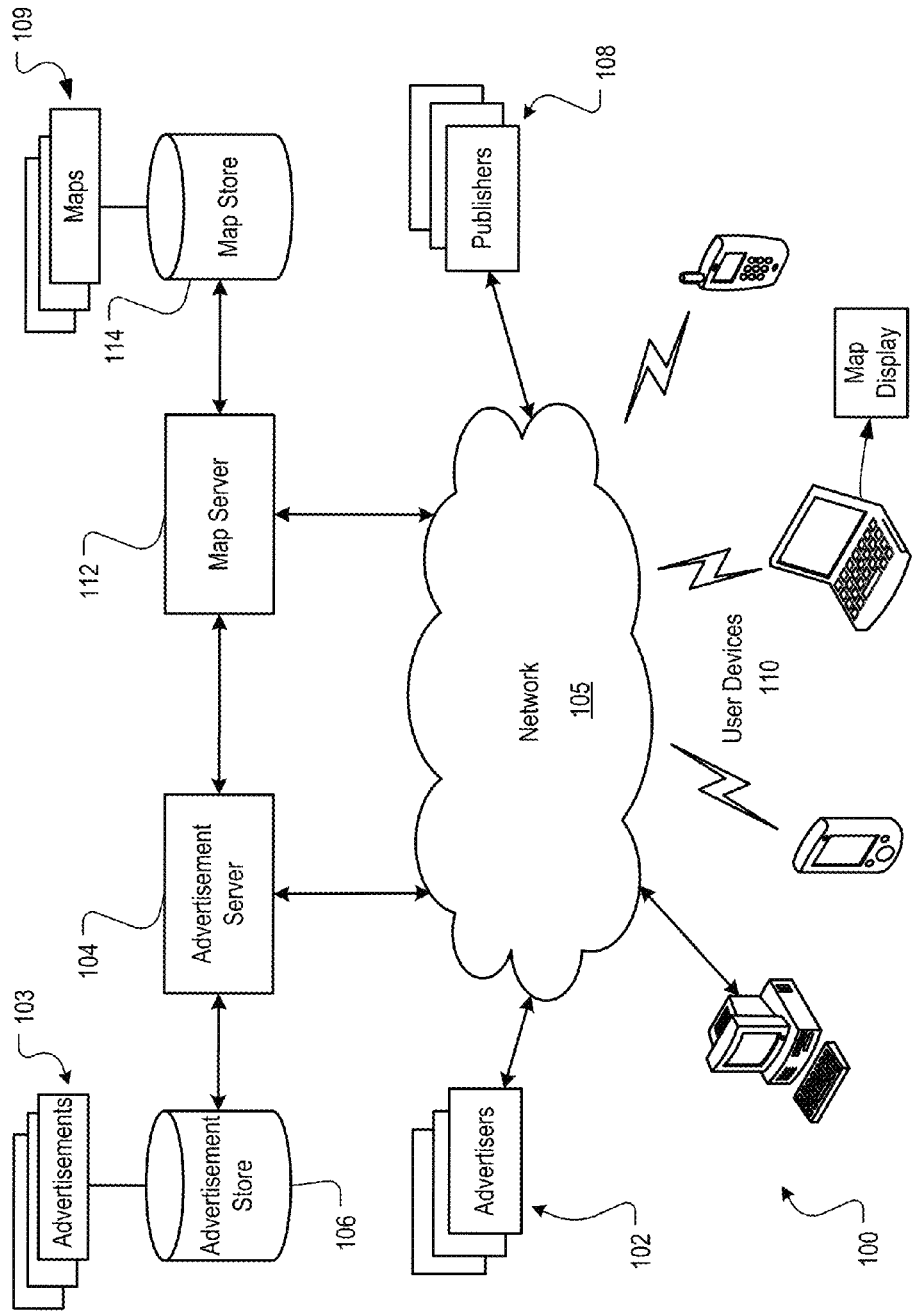
FIG. 1 is a block diagram of an example online map environment.

The subject matter of this specification relates to selection of content items, e.g., advertisements, in a display environment. In some implementations, the content items can be selected, for example, based on a probability that the content item is relevant to interests of a user that requests a particular map space (e.g., portion of a map). The probability that the content item is relevant to the interests of a user that is requesting the map space can be determined, for example, based on input data that have been received from user devices in response to previous presentations of the map space. The input data can be data that is representative of user actions. The user actions can be, for example, selection of map features (e.g., a display option) by the user, or submission of search queries while the map space was displayed.

The input data can be used to generate content targeting data, e.g., topic data that correspond to the input data and corresponding probabilities that the topics are related to the input data. The content targeting data can be provided to a content selector (e.g., advertisement server) that can identify a content item for presentation with the map space based on the topics and the corresponding probabilities. The selected content item can be received from the content item selector and presented with the requested map space. In some implementations, the content item can be presented in the map space that is presented. In other implementations, the content item can be presented adjacent to the map space in a display environment.

In a particular example, a user may request a map space for a city that includes a large number of wineries, e.g., Napa Valley. Therefore, input data may have been received through search queries for "winery" that were input by previous users while the map space was presented. In some implementations, these queries for "winery" can be used to identify related topics. For example, semantic rules can be used to determine that the topics "wine," "winery tour," and "pinot noir" are related to "winery." Additionally, a probability that each topic corresponds to the query "winery" can be determined. For example, "wine," "winery tour," and "pinot noir" may have respective probabilities of 0.3, 0.2, and 0.1 of being related to the query "winery", respectively.

These probabilities can be adjusted to represent a probability that the respective topics are relevant to any given user the requests the map space. In one example, a ratio of the number of input data received from users that are related to the content targeting data relative to all input data received from users can be determined. In turn, the probability that that the respective topics are relevant to any given user that requests the map space can be determined, for example, by multiplying the ratios and the respective probabilities. Continuing with the example above, if 30% of the input data received from users is related to the topic "wine" then there can be a 9% probability (e.g., 0.3*0.3) that a content item presented based on the topic "wine" will be relevant to any given user that requests the map space.

The content targeting data can be provided to a content item selector. In turn, the content item selector can identify a content item to be presented based on the content targeting data. For example, a content item with content related to "wine" can be identified for presentation with the map space. In turn, the content item can be presented in the map space or adjacent to the map space.

§1.1 Map Advertising

FIG. 1 is a block diagram of an example online map environment 100. The map environment 100 can facilitate the serving of content items for display with a map. Although this specification uses advertisements as example content items and advertising servers as example content servers, many other content items can also be served and presented from other servers, such as icon links to video clips; information links or information snippets; picture links; etc.

In some implementations, advertisers 102 can connect to an advertisement server 104 to upload advertisements 103, track advertising statistics, bid for advertising space, or otherwise interact with the advertisement server 104. The advertisers 102 can connect to the advertisement server 104 through the network 105. The network 105 can be a wide area network, local area network, the Internet, or any other public or private network, or combination of both.

The advertisements 103 may be in the form of graphical advertisements, text only advertisements, image advertisements, audio advertisements, video advertisements, advertisements combining one of more of any of such components, etc. The advertisements 103 may also include embedded information, such as links, meta-information, and/or machine executable instructions. The advertisements 103 can be formatted for presentation in maps 109. The advertisements 103 can be stored in an advertisement store 106 that is connected to the advertisement server 104.

The advertisements 103 can be displayed with a map 109 that is presented in a display environment on a user device 110. The map can be requested directly from a map server 112 that provides a map user interface on a user device 110 when the user device 110 connects to the map server 112 and requests a map that is generated from map data stored in a map store 114.

Alternatively, the map 109 can be requested from a publisher 108 in response to a user device 110 requesting content from the publisher 108. Example publishers 108 can be network content providers that publish websites. The publishers 108 receive requests for content from the user devices 110 and present content in response to the requests. In response to requests, the publishers 108 can include maps 109 with the content, thereby allowing the user devices 110 access to maps 109 through the publisher's website.

For example, the publisher 108 may be a business entity and may provide a map to its location on the home page of the publisher 108. In response to the map request by the publisher 108, the map server 112 selects data for the requested map from the map store 114 for presentation, and provides the selected data to either the publisher 108 or the requesting user device 110.

User devices 110 can connect to the publishers' websites or the map server 112 through the network 105 utilizing any device capable of communicating in a computer network environment and displaying retrieved information. Example user devices 110 include a web-enabled handheld device, a mobile telephone, a set top box, a game console, a personal digital assistant, a navigation device, or a computer.

The request for a map 109 can also include or generate a request for advertisements 103. The map server 112 can request advertisements 103 from the advertisement server 104. In some implementations, the advertisements 103 selected for delivery to the map server 112 can be selected based on their association with the map 109 selected by the map server 112 or any other advertisement selection criteria, such as a search query submitted by a user viewing the map space. For example, the advertisements 103 can be associated with the map 109 if the advertiser 102 has a retail location within the region of the map 109 selected. Similarly, the advertisements 103 can be presented in response to the user submitting a search query when the user is viewing the map.

The advertisements 103 can be placed on the map 109 at a location representative of the location associated with the advertiser 102 (e.g., as an overlay near a map of the retail location of the advertiser) or in a designated portion of the display environment (e.g., a map sidebar).

The selection of advertisements based on a user's action while the user is viewing the map, however, requires the user to submit a search query or select a map feature. Likewise, the selection of an advertisement based on a business location that corresponds to a location on the map space displayed on a user device presents advertisements that may not be of any interest to the user, e.g., a user may be viewing a map location of a vacation destination and be presented a content item for a plumbing service that is located near the vacation destination.

Thus, in some implementations, the advertisements 103 can be selected for presentation with a map space based on the advertisement's potential relevance to a user that is requesting the map space. Such potential relevance can be determined based on the interactions of previous users with the map space, as discussed below. Accordingly, advertisements 103 that are likely relevant to the interests of the user that requested the map space can be provided prior to the user taking any action within the map space of the map 109.

§2.0 Content Item Selection

Figure 2A:
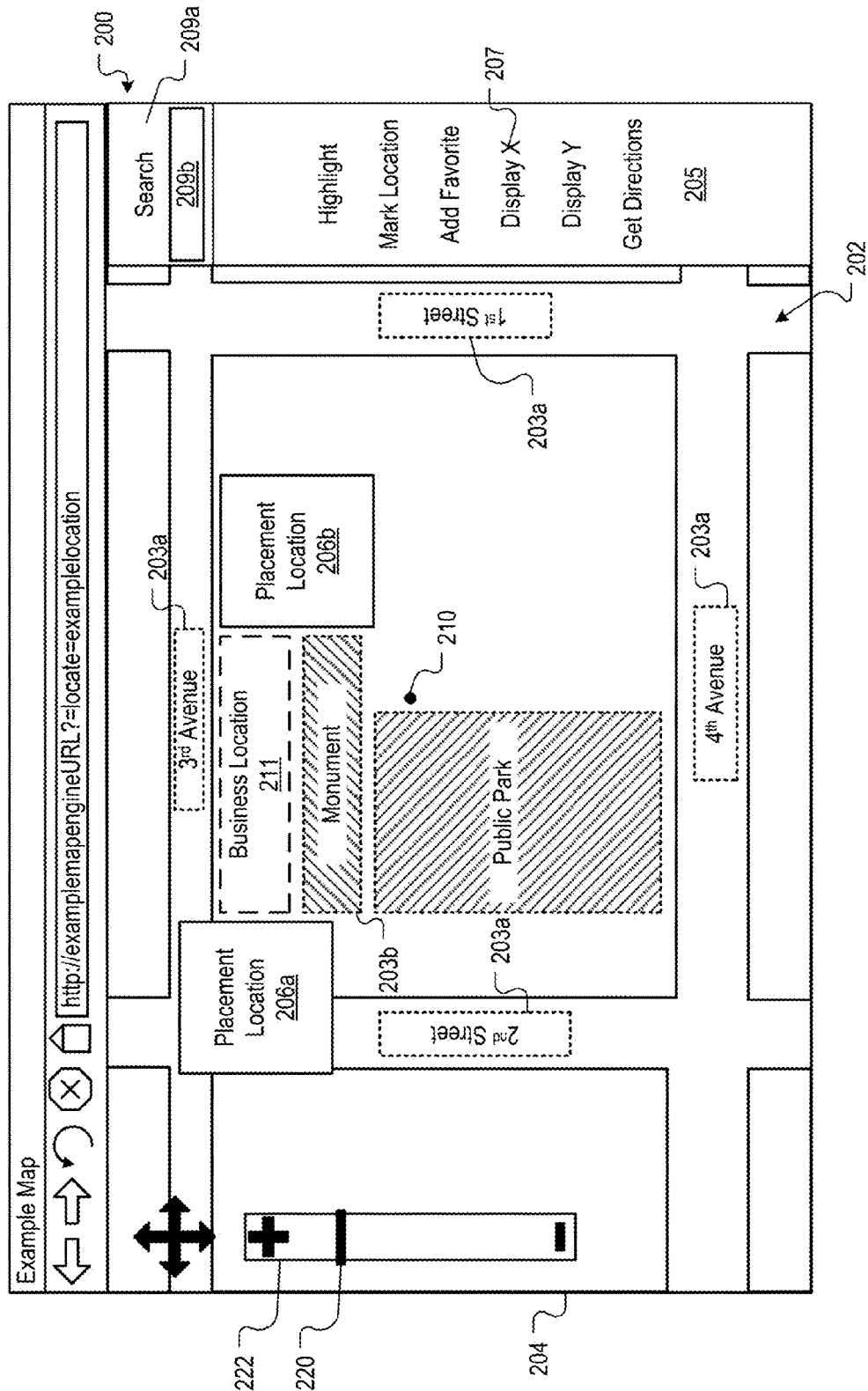
FIGS. 2A and 2B are examples of a map environment at different zoom levels and for which advertisements can be selected for presentation.
Figure 2B:
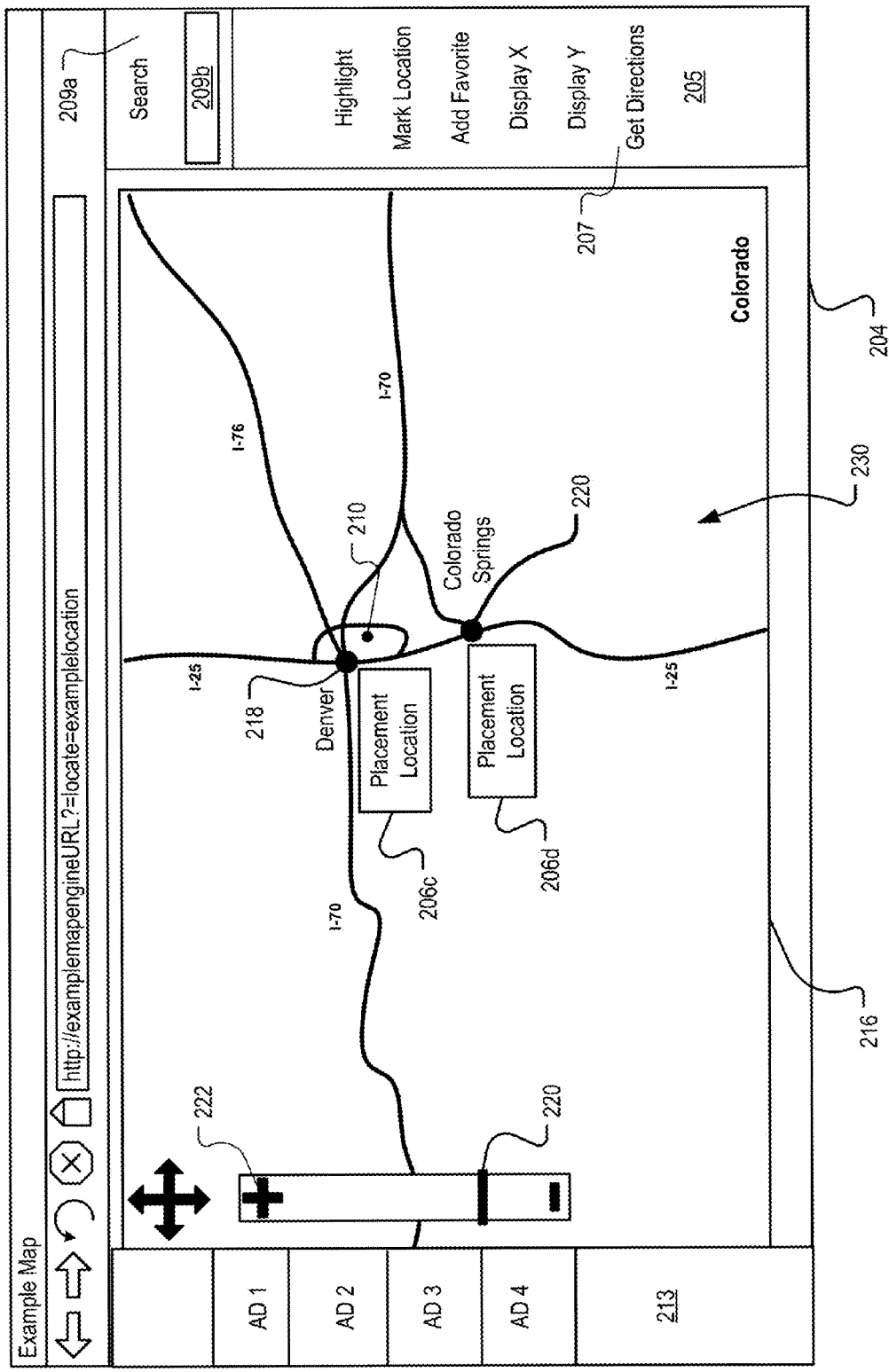

FIGS. 2A and 2B are examples of a map 200 at different zoom levels and for which advertisements can be selected for presentation. In particular, FIG. 2A depicts the map 200 at a first zoom level in a display region 204, such as a web browser window, and FIG. 2B depicts the map 200 at a second zoom level in the display region 204. Each of the maps in FIGS. 2A and 2B can have advertisements presented when the maps 200 are first displayed in the display region 204 and without further user interactions. These advertisements are selected from content targeting data associated with a map space 202. The content targeting data is based on input data, e.g., search queries and feature selections, that have been received from display interfaces in the display region 204 in response to presentations of the map space to other users prior to an instant request for the map space.

The map 200 at the first zoom level shows a map space 202 that is the portion of the map 200, selected by the map server that can be displayed on a user device in response to a request for the map space 202. In some implementations, the map space 202 is defined by the display region 204 and a zoom level. The zoom level represents the scaling of the map space 202 within the display region 204, and is graphically indicated by the position of a zoom bar 220 in a zoom control 222 in the display region 204.

The map space 202 that is presented to the user device can include map feature items 203, such as text items 203a that identify features on the map and/or graphic items 203b (e.g., a public park icon or a monument icon) that graphically illustrate map features. Additional map feature items 203 can include photos of landmarks or other points of interest, and icons that represent the location of a category of features (e.g., restaurants, coffee shops, nightclubs, or churches) on the map space 202. The feature items 203 can be rendered as part of the map space 202.

Some feature items 203 can be selectively enabled or disabled by a user through a first display interface, e.g., a feature menu 205, in the display region 204. For example, a user that is interested in viewing restaurant locations in the map space 202 can enable a map feature that places icons on the map space 202 that identifies the location of the restaurants. The feature items 203 can be selectively enabled or disabled by selecting a feature label 207 corresponding to the feature item 203 in a feature menu 205. The feature menu 205 can be included in the display interface 205 enabling users to click predefined selections. For example, a user can click on a feature label 207 that corresponds to the feature item 203 that the user would like to enable or disable. In some implementations, data can be submitted to the map server to report the selection of the feature label 207. In response to receiving the data, the map server can provide additional map data that can be used to facilitate display of the feature item 203 on the map space 202.

In some implementations, users can submit queries through a second display interface 209a, e.g., a search interface 209a with a text box 209b that is provided in the display region 204. The search interface 209a can, for example, allow users to type the query in text box 209b and submit the query to the map server 112.

Other display interfaces can also be used in the display region 204. Examples include selectable map widgets displayed on the space 202, such as building or business icons, rulers or path tracing tools that a user can use to measure distances or plot paths, to name just a few.

Also depicted in the map space 202 is a map location 210, as indicated by a dot. In the example of FIGS. 2A and 2B, the map location 210 is an approximate center location of the map spaces 202 and 230 that are presented in the display region 204. The representation of the map location 210 may not be shown on the map space 202, and thus can be conceptual. In other implementations, a dot, geographic coordinates, or other representation can be displayed in the map space 202 to represent the map location 210. The map location 210 can be a business address, e.g., "123 Third Avenue," or can be latitude and longitude coordinates, or any other identifier that represents the location of the map space 202 on the map 200.

When the map location 210 is a single reference point, similar map spaces may have map locations that are located within a common portion of the map. In some implementations, all map locations that are within a specified range of a reference map location can be associated with the reference map point. For example, if the map space 202 of FIG. 2A is repositioned slightly in any direction then the new map location will similarly be adjusted slightly. However, the data associated with the repositioned map space can be substantially the same as the originally presented map space 202. Therefore, rather than storing all of the data associated with the new map space as separate data that is associated with the new map location, the repositioned map space can be associated with the map location 210. For example, map locations within a map tile, a latitude/longitude range, or any other common area of a map can be associated with a single map location.

Other conventional map symbols, e.g., streets and city blocks, are illustrated by the conventional block and street symbols as shown in FIG. 2A. Some of these elements are omitted to avoid congestion of the drawings.

Input data that have been received by use of the display interfaces 205 or 209, or other display interfaces, can be used to identify content targeting data associated with the map space 202. This content targeting data can then be used to select advertisements for display in the map space 202, or some other portion of the display region, each time the map space is requested. For example, placement locations 206a, 206b can be allocated for presentation of advertisements in the map space 202, and advertisements based on the content targeting can be selected and displayed when the map space is 202 is initially displayed in the display region 204. Preferably, these advertisements are displayed so as not to preclude map features, such as features 203, building abstractions 211, or other features, such as park or monument symbols.

Similarly, the advertisements can be presented in a map sidebar 213, as illustrated in the map space 230 of FIG. 2B.

Advertisement selection improves initial advertisement targeting based on a request for a particular map space, as the advertisements are selected based, in part, on aggregate signals of user interests associated with the map space 202. For example, input data that has been received from previous users in response to the previous user's selection of a feature item 203 or search query submission can be used to generate content targeting data. In turn, the content targeting data can be associated with the map location 210 of the map space 202 that was presented when the input data was received. This content targeting data can be used to identify advertisements for which a probability of being relevant to users requesting the map space has been determined.

Content targeting data and associated map locations can be stored and updated over time to identify the frequency that the same or similar content targeting data is received in response to the presentation of a map space. For example, in the public park depicted in the map space 202, an annual coffee festival may be held. While the public park may otherwise have nothing to do with the topic of "coffee", over time, a statistically significant number of queries related to coffee may be input into the search interface 209 by users when viewing the map space 202 of FIG. 2A. In turn, the content targeting data can be updated to account for these queries (e.g., increment a query count), and thus content targeting data related to the topic of "coffee" is associated with the map location 210. Thereafter, when users request the map space 202, advertisements related to the topic of "coffee" may be initially displayed with the map space 202.

In some implementations, that content targeting data is defined by the most-frequently used input data. For example, queries associated with a map space can be ranked according to input frequency, and the top N queries, e.g., the top three queries, can be used to select advertisements for the map space 202.

In other implementations, the content targeting data can also include topics that are related to the input data. For example, clusters of topic data can be generated based on the input data. These clusters of topic data can include topics that are generated based on semantic rules that identify the topics as being related to the input data. For example, when the query "coffee" is received, the topics "latte," "cappuccino," and "coffee shop" can be generated. These topics can also be associated with the map location and stored to facilitate advertisement selection.

Many known data clustering techniques can be used to create the clusters of topic data. Example data clustering techniques can include agglomerative hierarchical clustering, partitional clustering, and spectral clustering, to name just a few.

In some implementations, a probability that the generated topics in the clustering data are related to the input data can be included in the content targeting data. The probability can be determined based on the semantic rules used to generate the topics, and can be a measure of correlation between the input data and the topics. For example, the topics "latte," "cappuccino," and "coffee shop" can have respective probabilities 0.1, 0.15, and 0.2 of being related to the query "coffee" based on the rules used to generate the topics. These probabilities can be associated with the topics and stored as additional content targeting data to facilitate content item selection.

In some implementations, the probability that input data is relevant to any user can be determined, for example, based on the frequency that the input data is received relative to all queries. For example, the query "coffee" may be received once out of every one thousand queries. Therefore, the probability that an advertisement selected based on the input data "coffee" is relevant to the interests of a user that subsequently requests the map space 202 can be 0.001, because one out of one thousand users have submitted a query for "coffee" in response to the presentation of the map space 202.

Similarly, probabilities that the topics included in the content targeting data are relevant to any user requesting the map space 202 can be determined based on the measure of relatedness between the input data and the topic. For example, the topic "coffee shop" can have a probability 0.0002 (e.g., 0.2*0.001) of being relevant to any user that requests the map space 202. Similarly, the topics "latte," and "cappuccino," can have probabilities of 0.0001 and 0.00015, respectively, of being relevant to any user that requests the map space 202. In some implementations, a topic's probability of being relevant can be the sum the probability of the topic being relevant when received as input data and the probability that the topic is relevant when generated based on another input data. For example, if a topic received as input data has a 0.1 probability of being relevant to any user and a 0.001 probability of being relevant when generated as a topic based on other input data, the total probability that the topic is relevant can be 0.101.

The input data and topics that are included as content targeting data for a map location 210 can be ranked based on the probabilities. Based on the example above, a possible ranking of the topics "coffee," "latte," "cappuccino," and "coffee shop" is provided in Table 1:

TABLE 1

| Rank | Topic | Probability |
| --- | --- | --- |
| 1 | Coffee | .001 |
| 2 | Coffee shop | .0002 |
| 3 | Cappuccino | .00015 |
| 4 | Latte | .0001 |

The topic ranking can be used to identify a subset of the content targeting data to use for advertisement selection. In some implementations, a threshold probability can be used to identify the subset of content targeting data. For example, topics that have a probability higher than 0.00018 can be used to identify advertisements for presentation with the map space 202. In this example, the topics "coffee" and "coffee shop" are used to identify advertisements. Similarly, a threshold number of topics can be used to identify advertisements for presentation with the map space 202. The threshold number of topics can be used independently or in conjunction with the threshold probability. For example, a maximum of three topics can be used to identify advertisements. When the threshold number of topics is used independently, the topics "coffee," "coffee shop," and "cappuccino" can be used to identify advertisements. However, if the threshold number of topics is used in conjunction with the threshold probability then the topics used to identify advertisements can be limited to "coffee" and "coffee shop" by the threshold probability requirement.

In response to a request for the map space 202, the advertisements can be selected, for example, by comparing the content targeting data to advertisement data that is associated with the advertisements. Advertisers can include, for example, keywords as advertising data that can be used to target the advertisements. Therefore, the content targeting data can be compared to the keywords that are associated with the advertisement to determine if the advertisement can be presented. If the content targeting data corresponds to the keywords that are associated with the advertisement, the advertisement can be selected for presentation. For example, when the content targeting data includes the topic "coffee," an advertisement for a coffee shop including the keyword "coffee" can be selected for presentation.

In some implementations, the advertisement that is selected can be the advertisement that has a keyword that corresponds to a topic in the content targeting data that has the highest probability of being relevant to the interests of a user that requested the map. For example, continuing with the above example, if the topics "coffee" and "coffee shop" are used to select an advertisement, then an advertisement that has the keyword "coffee" can be selected for presentation in the map space 202 because the topic "coffee" has a higher probability of being relevant to the interests of a user that requests the map space 202.

In some implementations, contextual data can be included in the content targeting data. The contextual data can be derived from content (e.g., text) that is presented adjacent to the map space. For example, a map space may be presented on a web page adjacent to textual content related to cars, such as on a webpage related to an automotive topic. In some situations, the term "cars" alone may not provide enough information to determine which car related advertisements (e.g., car repair shop, car dealership, car rentals, etc.) might be relevant to a user that requests the web page. Similarly, the query "repair shops," may be the query most received when the map space is presented. In some situations, the query "repair shops" alone might not provide enough information to determine which repair shop advertisement (e.g., car, watch, vacuum cleaner, etc.) might be relevant to a user that requests the web page.

However, the query "repair shops" can be combined with the contextual data "cars" so that the content targeting data includes "cars" and "repair shops." In turn, the content targeting data including "cars" and "repair shop" may be more likely to correspond to an advertisement for the car repair center than the advertisements for the other repair centers (e.g., watch or vacuum cleaner) or the other car advertisements (e.g., dealership, rentals). Thus, combining contextual data presented adjacent to the map space can be included in the content targeting data to facilitate selection of content items in response to a request for a map space.

In some implementations, the content targeting data that are associated with a map location 210 can depend on the zoom level of the map space 202. FIG. 2B depicts the map 200 at a lower zoom level, e.g., a "zoomed out" view relative to the view of FIG. 2A, as indicated by the adjusted position of the zoom bar 220 in the zoom control 222.

At the lower zoom level of FIG. 2B, a map space 230 is displayed in the display region 204. The map space 230 includes a larger portion of the map 200 and includes the map space 202 that was presented in FIG. 2A. Users that requests the map space 230 may have different interests than the users that requested the map space 202. In turn, the user may also select feature items 203 and submit queries that differ from those submitted while map space 202 was presented. Accordingly, content targeting data can be associated with the map space 230 that is different than the content targeting data that was associated with map space 202.

In some implementations, separate content targeting data can be maintained for each zoom level relative to a particular map location 210. For example, first content targeting data can be maintained for the map location 210 at the zoom level that results in the presentation of map space 202. Similarly, second content targeting data can be maintained for the map location 210 at the zoom level that results in the presentation of map space 230. Therefore, for each map space 202 and 230, advertisements can be independently selected that are likely relevant to respective users' interests.

In some implementations, the number of advertisements selected can be based in part on the zoom level of the map space. For example, a threshold zoom level can be identified, above which no advertisements will be selected for presentation. Similarly, a threshold number of advertisements can be identified for presentation for each zoom level of each map location 210. In some implementations, the number of advertisements that are selected can depend on the feature density of the map space. For example, if the density of the feature items 203 on the map space is high, there may be little room remaining for placement positions. Therefore, placing advertisements in the map space may result in a crowded map space. In turn, the utility of the map 200 may be diminished by adding advertisements to a crowded map space, because the map 200 can be difficult to use. For example, if advertisements are occluding feature items 203 a user may not be able to identify a location of interest.

§3.0 Example Content Item Selection System

Figure 3:
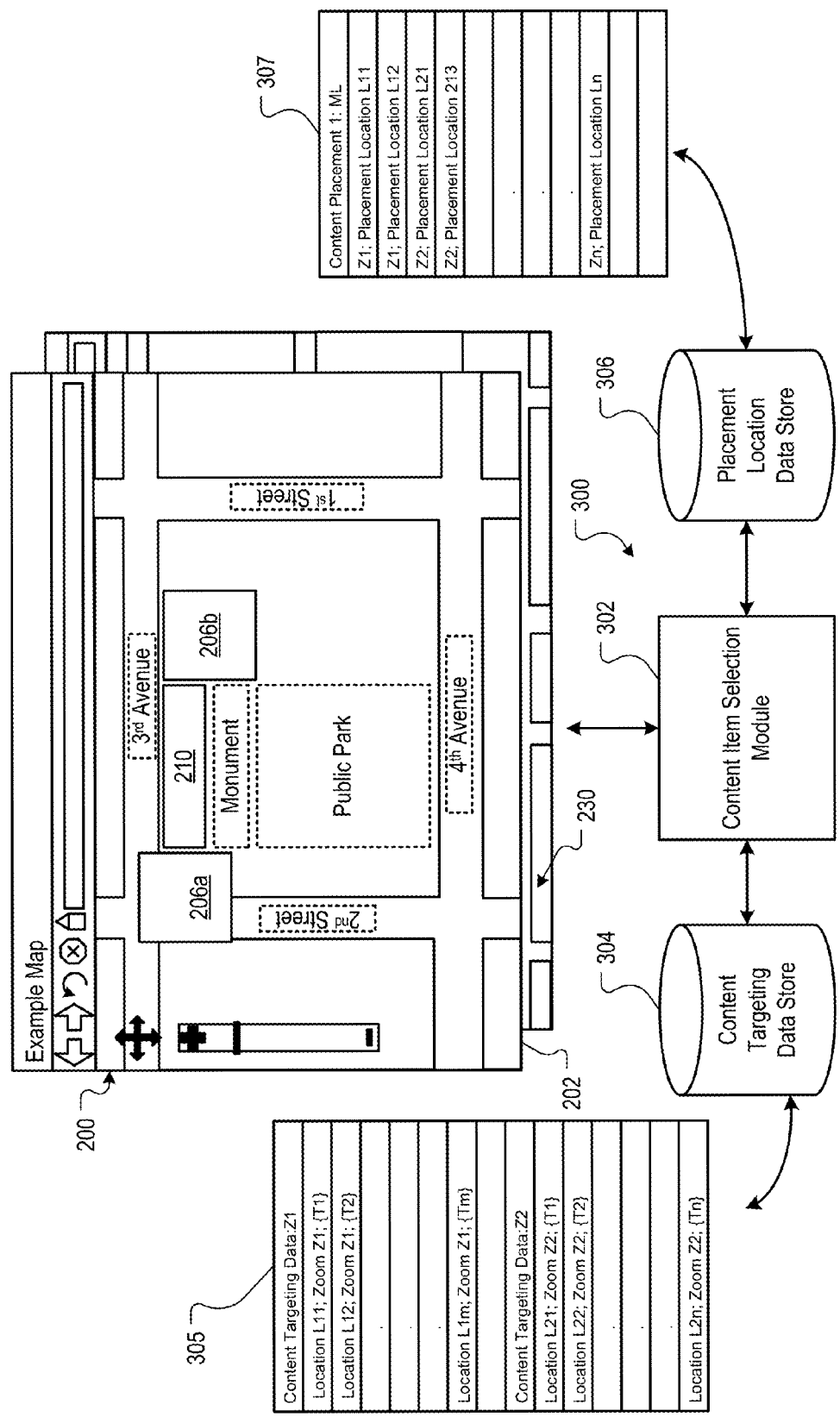
FIG. 3 is a block diagram of an example content item selection system.

FIG. 3 is a block diagram of an example content item selection system 300. The system 300 can be used to realize the features as discussed above, e.g., selection of content items for placement in requested map spaces based on content targeting data that can include a probability that the content item is relevant to the interests of a user that requested the map space.

The system 300 can include a content item selection module 302. The content item selection module 302 can be implemented, for example, in the map server 112, as described in FIG. 1. The content item selection module 302 is in data communication with a content targeting data store 304 and a placement location data store 306. The content targeting data store 304 and placement location store 306 can each be implemented, for example, in the map store 114, or in any other storage medium.

In some implementations, the content item selection module 302 can identify advertisements for placement based on the content targeting data that is stored in the content targeting data store 304. In turn, the content item selection module 302 can provide selected advertisements for presentation in placement positions that are defined by placement locations that are stored in the placement location data store 306. Alternatively, the content item selection module 302 can provide advertisements for display adjacent to a map space, such as in the map sidebar 213 of FIG. 2B.

§3.1 Content Targeting Data Store

The content targeting data store 304 can store content targeting data that can be used to identify advertisements for presentation in a map space, e.g., the map space 202 or 230. For example, the content targeting data can include input data that is received from a user device while the map space is presented. In some implementations, the content targeting data can further include topics that are generated based on the input data and semantic rules. The content targeting data can further include a probability that each topic is relevant to the interests of a user that requested the map space. The content targeting data is associated with a map location, e.g., coordinates corresponding to the map location.

As discussed above, the content targeting data for a particular map location can differ at each zoom level. Thus, each zoom level for a map location can have a separate content targeting data record. In turn, different advertisements can be selected for the map location at different zoom levels. In some implementations, the number of advertisements can similarly depend on the zoom level. Above a threshold zoom level, advertisements can be omitted from the map space. Similarly, when a selected feature item density is realized, advertisements can be omitted from the map space to prevent cluttering the map space. Thus, in some implementations, the content targeting data store 304 can index the content targeting data records according to the zoom level and the map location to which the content targeting data is related.

The map location can be a defined point on the map (e.g., coordinate location). In some implementations, content targeting data for multiple map locations can be consolidated into a single content targeting data record. For example, a map can be divided into a grid, and each portion of the grid can correspond to a particular portion (e.g., geographic region) of the map. In turn, content targeting records that are associated with a map location that is within the particular portion of the map can be consolidated into a single content targeting data record. The content targeting data can be stored according to the map location with which the data is associated to facilitate retrieval of the content targeting data in response to a map space request. For example, given a map location that corresponds to the map space request, content targeting data that are associated with a map location that is in the same grid region can be identified for retrieval, while content targeting data outside the grid region can be ignored.

An example content targeting data structure 305 is illustrated in FIG. 3. Content targeting data records for two zoom levels, Z1 and Z2, are depicted. Each content targeting data record for the first zoom level, Z1, is indexed by its map location (e.g., Locations 11, 12 . . . 1m) and zoom level (e.g., Zoom Z1). Each content targeting data record also includes content targeting data (e.g., T1, T2 . . . Tm) that include the topic data that were generated in response to previous user interactions with the corresponding map space. For example, if the content targeting record 11 contains content targeting data for the map space 202 of FIG. 2A, then the map location 11 can correspond to map location 210 and the zoom level Z1 can correspond to the zoom level of map space 202. Accordingly, when a map space that corresponds to map location 210 is requested at zoom level Z1 the content targeting data record 11 can be retrieved to facilitate identification of advertisements for presentation with the map space.

Similarly, each content targeting data record at the second zoom level, Z2, which corresponds to the zoom level of FIG. 2B, is identified and indexed by its map location (e.g., Locations L21, L22 . . . L2n) and zoom level (e.g., Zoom Z2). Each of these content targeting records also includes content targeting data (e.g., T1, T2 . . . Tn) that include the topic data that were generated in response to previous user interactions with the corresponding map space. Thus, when a map space that corresponds to map location 210 is requested at zoom level Z2 the content targeting data record 21 can be retrieved to facilitate identification of advertisements for presentation with the map space. Likewise, the remaining content targeting data records 2 . . . n can correspond to the map spaces that are associated with additional map locations.

§3.2 Placement Location Data Store

Advertisements that are selected in response to the content data can be displayed in the map sidebar 213 or on the map space, e.g., map space 230. If advertisements are to be rendered on the map space, then an optional placement location data store 306 can store placement locations for advertisements at multiple zoom levels. In some implementations, the placement locations for an advertisement can be stored in a content placement data structure 307. Each advertisement can have an associated map location ML, and a plurality of placement location data stored in placement records. The placement location data are based on the map location ML and zoom level Z1 . . . Zq, and can define placement locations for the advertisement based on the map location ML so that when a map space is presented at the zoom level with the advertisement, the advertisement does not interfere with map feature items that are presented on the map space at the zoom level or otherwise clutter the map space.

For example, location ML can correspond to the map location 210 shown in the map spaces 202 and 230 of FIGS. 2A and 2B. The records indexed by the zoom level Z1 and corresponding placement locations L11 and L12 can correspond to the locations 206a and 206b graphically depicted in the map space 202 of FIG. 2A. Likewise, the record indexed by the zoom level Z2 and corresponding location L21 can correspond to the location 206c graphically depicted in the map space 230 of FIG. 2B.

§3.3 Content Item Selection Module

The content item selection module 302 is responsible for selecting advertisements for presentation with the map space. The content item selection module 302 can be implemented, for example, in the map server 112.

§3.3.1 Content Item Selection

The content item selection module 302 can receive notification that a map space has been requested and can identify the map location and the zoom level associated with the map space. The map location can be either pre-associated with the map space, (e.g., a center location for the map space), or can be assigned to the map space as the result, for example, of the pre-assigned map space having a map location that is within a defined proximity of a map location that is associated with a pre-existing content targeting data record. In either case, the content item selection module 302 queries the content targeting data store 304 for a corresponding content targeting data record.

For example, when a map space is requested from the map server 112 of FIG. 1, the map server 112 can provide information that identifies the map location 210 for the map space to the content item selection module 302. The content item selection module 302 can use the map location 210 and zoom level to identify the content targeting data that is required. In turn, the content item selection module 302 can retrieve the appropriate content targeting data record for the geographic region from the content targeting data store 304 as indexed by the zoom level at which the map space corresponding to the map location is to be displayed. Thus, for the map location 210 at the zoom level Z1, the content targeting data record L11 can be retrieved. Advertisements can then be selected based on the content targeting data contained in content targeting data record L11. Likewise, for the map location 210 at the zoom level Z2, the content targeting data record L21 can be retrieved, and the advertisement can then be selected based on the content targeting data contained in content targeting data record L21.

In some implementations, the content item selection module 302 can provide the information from the content targeting data record to the advertisement server 104 of FIG. 1 to receive advertisements that correspond to the content targeting data in the record. The advertisement server 104 can identify advertisements for presentation with a map environment, for example, based on keywords that are associated with content targeting data, e.g., keywords.

In other implementations, the content item selection module 302 can generate a virtual web page based on the corresponding content targeting data for a map space. A virtual web page can be created if, for example, the advertising server 104 is configured to provide content items, e.g., advertisements, based on web page content. For example, in response to a user requesting the map space 202 of FIG. 2A, the advertisement server 104 can receive a request for advertisements from a virtual web page including a page title "Coffee," and which contains a headline "Coffee Shop," and the text "Cappuccino" as an article. In turn, the advertisement server 104 can identify the appropriate content for a virtual web page based on an advertisement relevancy determination algorithm that takes into account keywords and the placement of the keywords in a web page. For example, the advertisement server 104 can use the identified topics to select advertisements that are associated with the keywords "coffee," "coffee shop," and "cappuccino."

Additionally, the advertisement server 104 can rank the advertisements in an order in which they should be selected for presentation. This ranking can be done, for example, based on the type of content that resulted in the selection of the advertisement. In some implementations, the advertisements that are selected based on a title can be ranked highest, advertisements selected based on a header can be ranked after those selected based on title content, and advertisements selected based on article content can be ranked after those selected based on header content. Thus, in the above example, advertisements can be ranked for selection and/or display as provided in Table 2.

TABLE 2

| Topic | Page Location | Rank |
|---|---|---|
| Coffee | Title | 1 |
| Coffee shop | Header | 2 |
| Cappuccino | Article | 3 |

The virtual page location for each topic of the content targeting data can be determined based on the probability of relevance that is associated with the topic. Threshold probabilities can define categories of title, header, or article content for the content targeting data. For example, a probability of 0.001 or higher associated with a topic in the content targeting data can define a title topic, a probability of 0.005 or higher can define a header topic, and topics associated with all other probabilities can be considered article content. Thus, the advertisement server 104 can identify advertisements for presentation with map environments, regardless of the textual content included with the map environment, in a manner similar to that for other web pages that request advertisements.

§3.3.2 Generating Content Targeting Data

In some implementations, the content item selection module 302 can generate a content targeting data record based on first input data that is received while a map space is presented. The content item selection module 302 can update the content targeting data records based on subsequent input data that is received while the map space is presented. After the content targeting data is generated, it can be stored in the content targeting data store 304 as a content targeting data record that is associated with a map location.

In some implementations, the content item selection module 302 can generate content targeting data for a map location based on a query received from a user device while the map space is presented. For example, the content item selection module 302 can receive the query "coffee" from a user device while the map space of FIG. 2A is presented. In turn, the content item selection module 302 can create or update a content targeting data record for the map location 210 and zoom level that corresponds to the map space 202 to include the topic "coffee".

The content item selection module 302 can also generate content targeting data for a map location based on the selection of a feature item. In some implementations, the selection of a feature item can be mapped to a corresponding keyword. For example, if input data is received from a user device indicating the selection of a feature that presents icons representing the locations of all restaurants located within the map space, then the content item selection module 302 can include the topic "restaurant" in the content targeting data record that corresponds to the map location and zoom level.

The content item selection module 302 can generate additional topics based on the input data as, described above. In some implementations, the content item selection module 302 can generate topics that are related to the input data. For example, based on the input data "restaurants," the content item selection module 302 can generate the topics "cafe" and "deli." In turn, these topics can be included in the content targeting data record that corresponds to the map location and zoom level of the map space presented when the input data was received.

In some implementations, the content item selection module 302 can generate the topics by applying semantic rules to the input data. The semantic rules can identify the topics, for example, based on a correlation between the meaning and use of the topics and the input data. Based on this correlation, the content item selection module 302 can assign a measure of relatedness (e.g., probability that the topic is related to the input data) to the topic.

Based on the measure of relatedness, the content item selection module 302 can generate a probability that the topic is relevant to the user interest of a user that requests the map space corresponding to the content data record. For example, the content item selection module 302 can maintain a count of the number of requests for a particular map space, the total count of input data that are received, and counts identifying the number of times that each topic is received as input data. The content item selection module 302 can use these counts to determine the percentage of total input data that correspond to each topic as well as the percentage of all map requests for which each topic is received as input data. Based on these percentages, the probability that each topic is relevant to any user that requests the map space can be determined. The content item selection module 302 can store these probabilities with the topics in the content targeting data record to facilitate selection of advertisements, as described above.

§4.0 Example Process Flow

Figure 4:
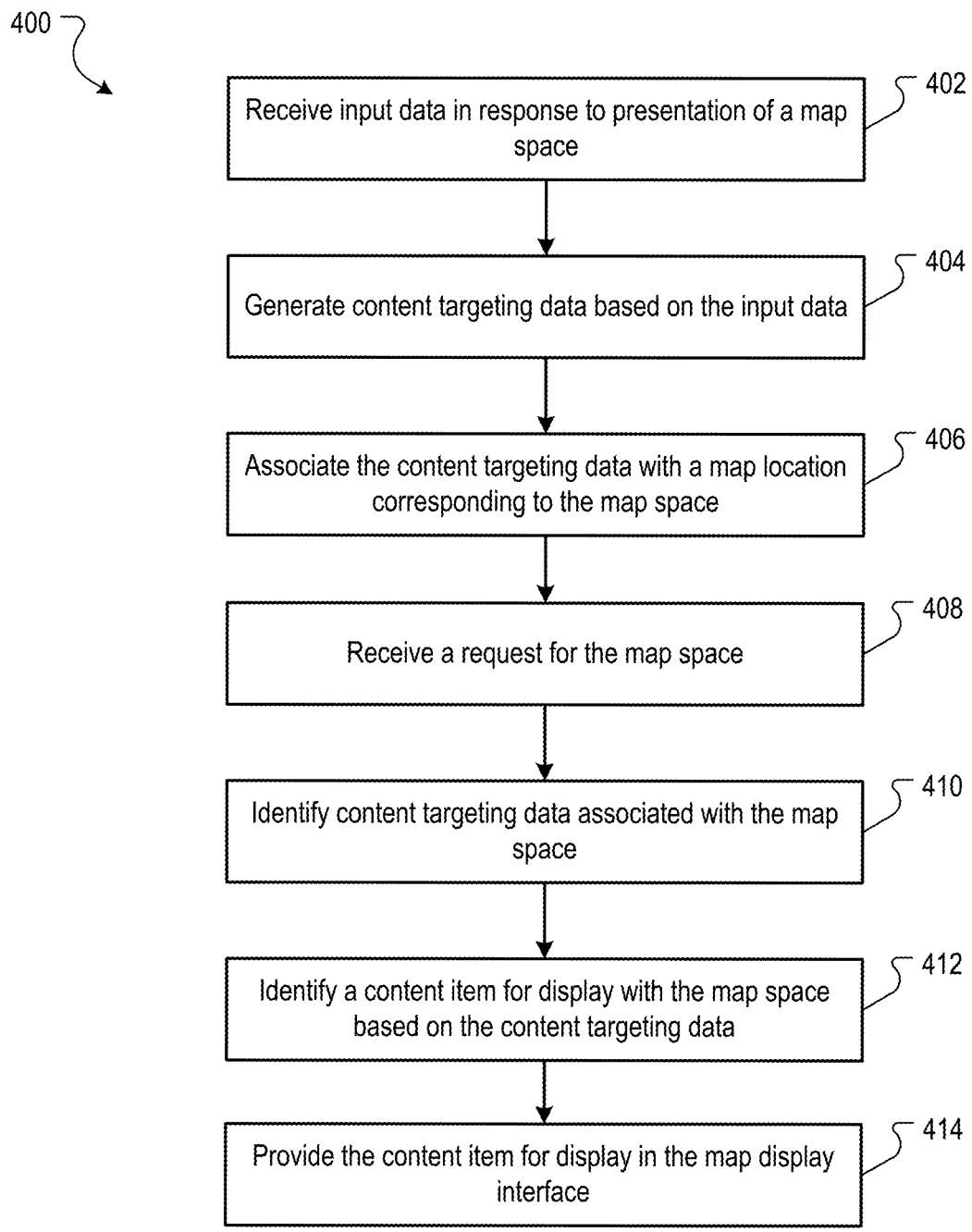
FIG. 4 is a flowchart of an example process of selecting a content item for presentation with a map.

FIG. 4 is a flowchart of an example process 400 of selecting a content item for presentation with a map. The process 400 can be used, for example, in the map server 112 of FIG. 1 and/or the content item selection module 302 of FIG. 3.

Stage 402 receives input data in response to presentation of a map space. In some implementations, the input data can correspond to data received based on selection of a feature item or a query received while the map space is presented. The input data can be received, for example, by the map server 112 of FIG. 1 and/or the content item selection module 302 of FIG. 3.

Stage 404 generates content targeting data based on the input data. In some implementations, content targeting data can include the input data and topics related to the input data. The content targeting data can be generated, for example, by the map server 112 of FIG. 1 and/or the content item selection module 302 of FIG. 3.

Stage 406 associates the content targeting data with a map location corresponding to the map space. In some implementations, the content targeting data can be associated with the map location based on a zoom level. The association can be performed, for example, by the map server 112 of FIG. 1 and/or the content item selection module 302 of FIG. 3.

Stage 408 receives a request for the map space. In some implementations, the map space is a portion of a map for presentation in a display region on a user device. The request for the map space can be received, for example, by the map server 112 of FIG. 1 and/or the content item selection module 302 of FIG. 3.

Stage 410 identifies content targeting data associated with the map space. In some implementations, the content targeting data is based on input data that have been received from display interfaces in response to presentations of the map space. The input data can be received in the display interfaces prior to the request for the map space. In some implementations, the content targeting data can be identified by identifying a map location associated with the map request and identifying the content targeting data that is associated with the map location. The content targeting data can be identified, for example, by the map server 112 of FIG. 1 and/or the content item selection module 302 of FIG. 3.

Stage 412 identifies a content item for display with the map space based on the content targeting data. In some implementations, the content item can be identified by the map server 112 of FIG. 1 and/or the content item selection module 302 of FIG. 3.

Stage 414 provides the content item for display in the display region on the user device in response to the request for the map space. The map server 112 of FIG. 1 and/or the content item selection module 302 of FIG. 3 can provide the content item for display in the display region.

Figure 5:
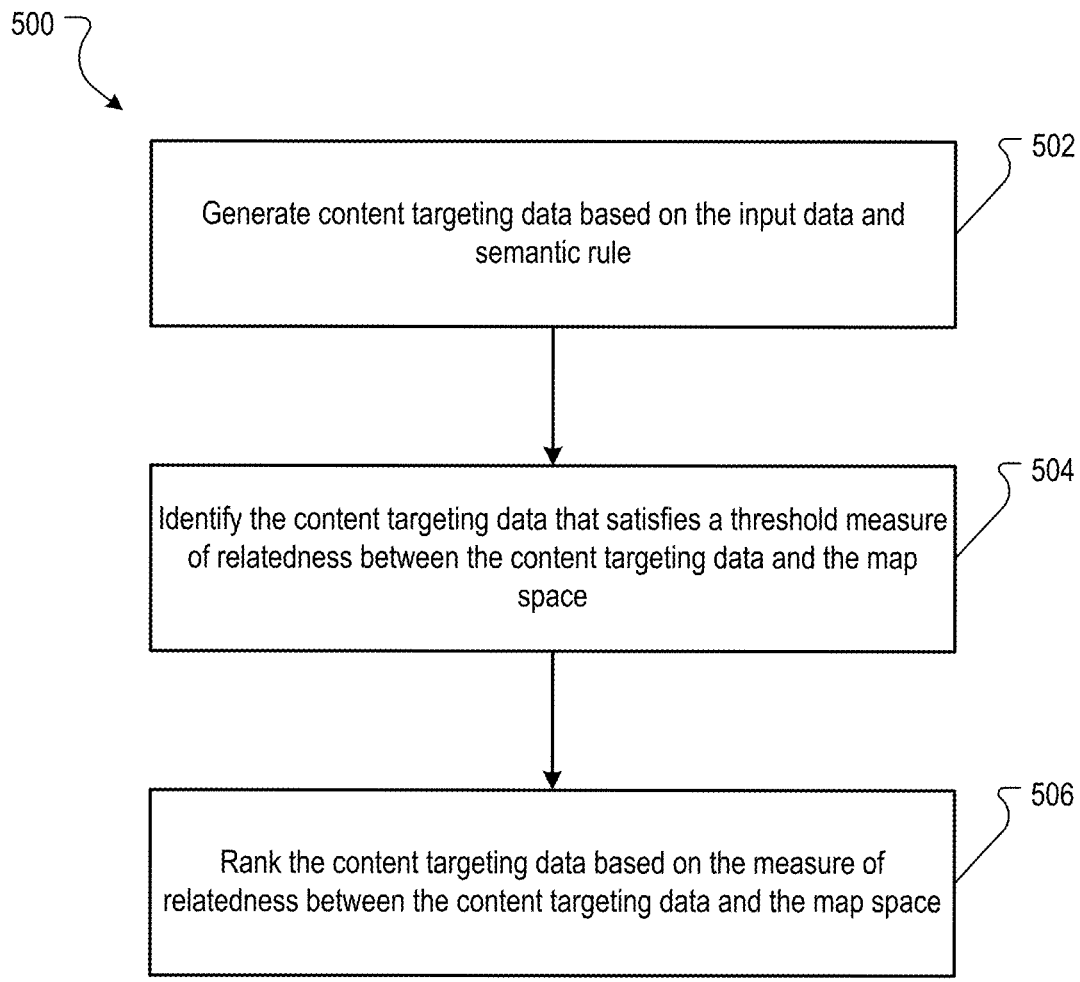
FIG. 5 is a flowchart of an example process of generating content targeting data based on input data.

FIG. 5 is a flowchart of an example process 500 of generating content targeting data based on input data. The process 500 can be used, for example, in the map server 112 of FIG. 1 and/or the content item selection module 302 of FIG. 3. The process 500 can be used, for example, to implement stage 404 of FIG. 4.

Stage 502 generates content targeting data based on the input data and semantic rule. In some implementations, the semantic rules can be used to generate content targeting data that are semantically related (e.g., correspond to the meaning) of the input data. The content targeting data can be generated, for example, by the map server 112 of FIG. 1 and/or the content item selection module 302 of FIG. 3.

Stage 504 identifies the content targeting data that satisfies a threshold measure of relatedness between the content targeting data and the map space. In some implementations, the threshold measure of relatedness can be a threshold probability that the content targeting data is relevant to the interests of a user that requests the map space. The content targeting data identification can be performed, for example, by the map server 112 of FIG. 1 and/or the content item selection module 302 of FIG. 3.

Stage 506 ranks the content targeting data based on the measure of relatedness between the content targeting data and the map space. In some implementations, the measure of relatedness can be a probability that the content targeting data is related to the map space. In some implementations, the measure of relatedness can be a probability that the content targeting data is relevant to the interests of a user that requests the map space. The ranking can be performed, for example, by the map server 112 of FIG. 1 and/or the content item selection module 302 of FIG. 3.

Figure 6:
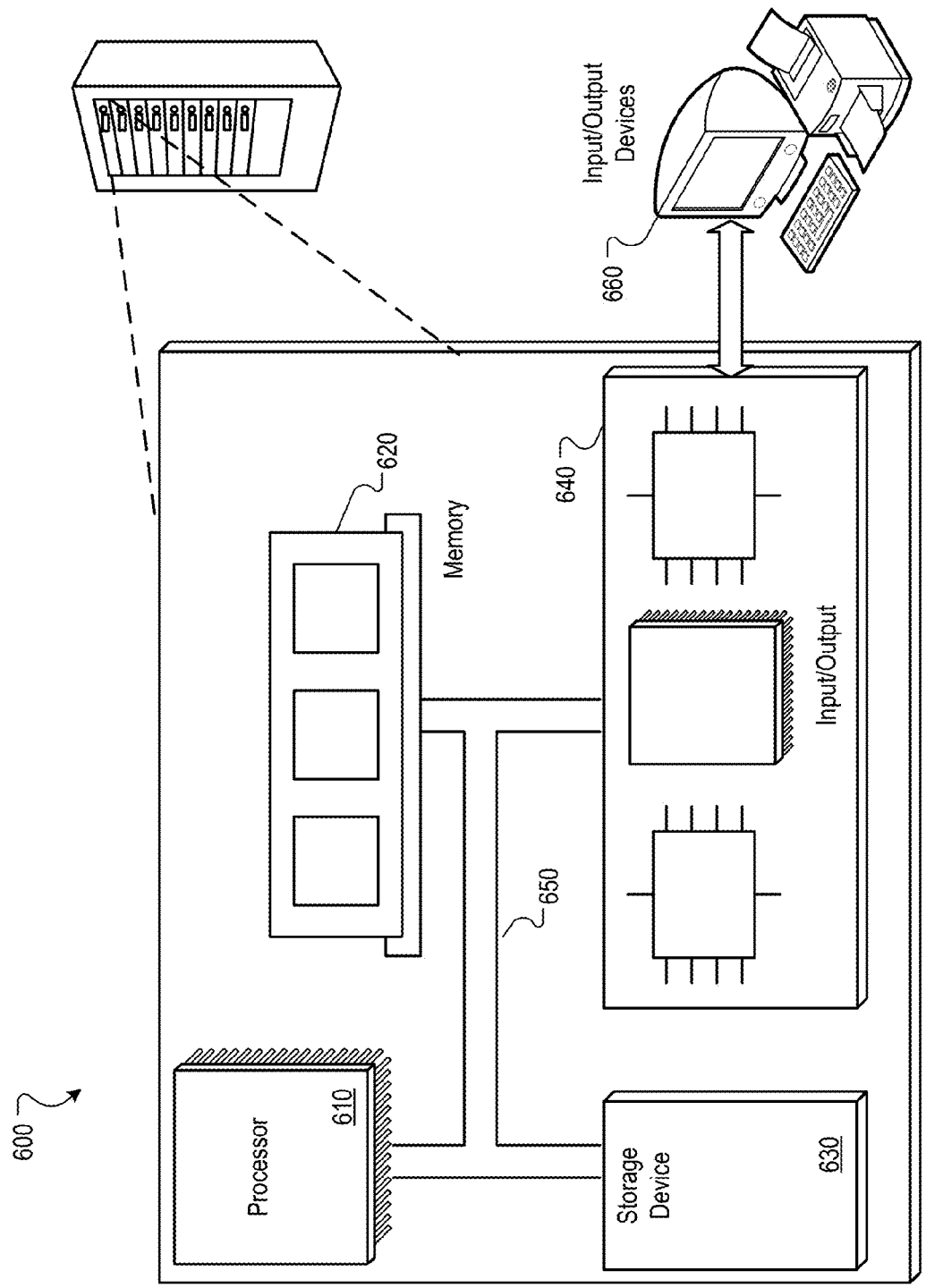
FIG. 6 is block diagram of an example computer system that can be used to facilitate positioning of content on online maps.

FIG. 6 is block diagram of an example computer system 600 that can be used to facilitate selection of content items for presentation with online maps. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, or some other large capacity storage device.

The input/output device 640 provides input/output operations for the system 600. In one implementation, the input/output device 640 can include one or more of a network interface devices, e.g., an Ethernet card, a serial communication device, e.g., an RS-232 port, and/or a wireless interface device, e.g., and 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

The content item selection module 302 can be realized by instructions that upon execution cause one or more processing devices to carry out the processes and functions described above. Such instructions can comprise, for example, interpreted instructions, such as script instructions, e.g., JavaScript or ECMAScript instructions, or executable code, or other instructions stored in a computer readable medium. The content item selection module 302 can be distributively implemented over a network, such as a server farm, or can be implemented in a single computer device.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, a processing system. The computer readable medium can be a machine readable storage device, a machine readable storage substrate, a memory device, a composition of matter effecting a machine readable propagated signal, or a combination of one or more of them.

The term "processing system" encompasses all apparatus, devices, and machines for processing data, including by way of example a programmable processor, a computer, or multiple processors or computers. The processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

Implementations of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet. The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
   determining that a map location of a map was previously presented at two or more different zoom levels;
   for each zoom level from the two or more different zoom levels:
      determining, for each of two or more content selection criterion, a frequency with which the content selection criterion was received from a plurality of user devices while the map location was presented at the plurality of user devices and at the zoom level;
      ranking the two or more content selection criterion based on the frequency for each of the content selection criterion; and
      selecting a ranked content selection criterion as content selection data for the map location when presented at the zoom level;
   receiving, from a first user device, a request for a map space that includes the map location, wherein the map space is a portion of a map for presentation in a display region on a user device;
   identifying a zoom level corresponding to the request;
   identifying content selection data for the map location and the zoom level based on the ranked content selection criterion;
   selecting, by one or more computers, a content item for display with the map space, the content item being selected based on the content selection data and independent of user interaction with the map space at the first user device; and
   providing, in response to the request, data specifying the selected content item to the first user device.

2. The method of claim 1, wherein selecting a content item for display with the map space comprises selecting the content item prior to user interaction with the map space at the first user device.

3. The method of claim 2, further comprising providing the requested map space to the first user device in response to the request.

4. A system comprising:
   a content selection data store; and
   one or more computers that interact with the content selection data store, and execute instructions that cause the one or more computers to perform operations including:
      determining that a map location was previously presented at two or more different zoom levels;
      for each zoom level from the two or more different zoom levels:
         determining, for each of two or more content selection criterion, a frequency with which the content selection criterion was received from a plurality of user devices while the map location was presented at the plurality of user devices and at the zoom level;
         ranking the two or more content selection criterion based on the frequency for each of the content selection criterion; and
         selecting a ranked content selection criterion as content selection data for the map location when presented at the zoom level;
      receiving, from a first user device, a request for a map space that includes the map location, wherein the map space is a portion of a map for presentation in a display region on a user device;
      identifying a zoom level corresponding to the request;
      identifying the content selection data for the map location and the zoom level based on the ranked content selection criterion;

selecting a content item for display with the map space, the content item being selected based on the content selection data and independent of user interaction with the map space at the first user device; and providing, in response to the request, data specifying the selected content item to the first user device.

5. The system of claim 4, wherein selecting a content item for display with the map space comprises selecting the content item prior to user interaction with the map space at the first user device.

6. The system of claim 5, wherein the instructions cause the one or more computers to perform operations comprising providing the requested map space to the first user device in response to the request.

7. Non-transitory computer readable media storing instructions that are executable by a processing device and upon such execution cause the processing device to perform operations comprising:

determining that a map location was previously presented at two or more different zoom levels;

for each zoom level from the two or more different zoom levels:

determining, for each of two or more content selection criterion, a frequency with which the content selection criterion was received from a plurality of user devices while the map location was presented at the plurality of user devices and at the zoom level;

ranking the two or more content selection criterion based on the frequency for each of the content selection criterion; and selecting a ranked content selection criterion as content selection data for the map location when presented at the zoom level;

receiving, from a first user device, a request for a map space that includes the map location, wherein the map space is a portion of a map for presentation in a display region on a user device;

identifying a zoom level corresponding to the request;

identifying content selection data for the map location and the zoom level based on the ranked content selection criterion;

selecting a content item for display with the map space, the content item being selected based on the content selection data and independent of user interaction with the map space at the first user device; and providing, in response to the request, data specifying the selected content item to the first user device.

8. The computer readable media of claim 7, wherein selecting a content item for display with the map space comprises selecting the content item prior to user interaction with the map space at the first user device.

9. The computer readable media of claim 8, wherein execution of the instructions further cause the processing device to perform operations comprising providing the requested map space to the first user device in response to the request.

* * * * *